United States Patent
Kama et al.

(10) Patent No.: US 10,450,028 B2
(45) Date of Patent: Oct. 22, 2019

(54) TRAVELING APPARATUS

(71) Applicant: TOYOTA JIDOSHA KABUSHIKI KAISHA, Toyota-shi, Aichi-ken (JP)

(72) Inventors: Takeshi Kama, Nagakute (JP); Makoto Kakuchi, Toyota (JP); Makoto Mori, Nagakute (JP)

(73) Assignee: TOYOTA JIDOSHA KABUSHIKI KAISHA, Toyota-shi, Aichi-ken (JP)

( * ) Notice: Subject to any disclaimer, the term of this patent is extended or adjusted under 35 U.S.C. 154(b) by 162 days.

(21) Appl. No.: 15/675,871

(22) Filed: Aug. 14, 2017

(65) Prior Publication Data

US 2018/0065701 A1 Mar. 8, 2018

(30) Foreign Application Priority Data

Sep. 7, 2016 (JP) .................................. 2016-175062

(51) Int. Cl.
*B62K 11/14* (2006.01)
*B62K 5/027* (2013.01)
(Continued)

(52) U.S. Cl.
CPC .............. *B62K 11/14* (2013.01); *B62K 3/002* (2013.01); *B62K 5/027* (2013.01); *B62K 15/006* (2013.01); *B62K 19/18* (2013.01); *B62K 21/00* (2013.01); *B62K 2204/00* (2013.01); *Y02T 10/7258* (2013.01)

(58) Field of Classification Search
CPC ........ B62K 11/14; B62K 3/002; B62K 5/027; B62K 15/006; B62K 21/00; B62D 7/15; B62D 7/1509
See application file for complete search history.

(56) References Cited

U.S. PATENT DOCUMENTS 5,288,091 A * 2/1994 Deschamps .............. B62D 7/15
180/409
5,629,850 A * 5/1997 Okawa ................... B60K 28/16
180/197

(Continued)

FOREIGN PATENT DOCUMENTS

JP 01-106717 A 4/1989
JP 2005-231415 A 9/2005
(Continued)

*Primary Examiner* — Joseph M Rocca
*Assistant Examiner* — Michael R Stabley
(74) *Attorney, Agent, or Firm* — Sughrue Mion, PLLC

(57) ABSTRACT

Provided is a traveling apparatus including a front wheel steered by an operation by a user and two rear wheels that are rotationally driven independently from each other disposed along a traveling direction and on which the user rides when traveling, the traveling apparatus including: a front wheel supporting member; a rear wheel supporting member; an adjusting mechanism configured to adjust a wheel base length between the front wheel and the rear wheels by changing, by the user, a relative position of the front wheel supporting member and the rear wheel supporting member; and a controller configured to control a rotational speed of each of the rear wheels based on the wheel base length and a steering angle of the front wheel in such a way that a moving track of the front wheel and moving tracks of the rear wheels draw a concentric arc.

3 Claims, 10 Drawing Sheets

(51) Int. Cl.
  *B62K 19/18* (2006.01)
  *B62K 3/00* (2006.01)
  *B62K 15/00* (2006.01)
  *B62K 21/00* (2006.01)

(56) References Cited

U.S. PATENT DOCUMENTS

| | | | | |
|---|---|---|---|---|
| 5,950,748 | A * | 9/1999 | Matsumoto | B62D 55/02 180/6.24 |
| 6,112,843 | A * | 9/2000 | Wilcox | B60K 17/36 180/209 |
| 7,552,784 | B2 * | 6/2009 | Torita | B60B 19/003 180/24.07 |
| 7,717,200 | B2 * | 5/2010 | Kakinuma | A63C 17/08 180/218 |
| 8,267,205 | B2 * | 9/2012 | Ishii | B60K 17/30 180/6.44 |
| 8,594,892 | B2 * | 11/2013 | Fujimoto | B62D 15/024 180/446 |
| 8,630,770 | B2 * | 1/2014 | Matsumoto | B60L 15/2036 701/41 |
| 8,751,128 | B2 * | 6/2014 | Morita | A61G 5/041 303/125 |
| 8,894,088 | B2 * | 11/2014 | Lark, Jr. | B62D 21/14 280/639 |
| 2008/0006455 | A1 | 1/2008 | Torita | |
| 2008/0116665 | A1 | 5/2008 | Nakaizumi et al. | |
| 2011/0224872 | A1 * | 9/2011 | Reed | B62D 6/002 701/41 |
| 2012/0101703 | A1 | 4/2012 | Morita | |
| 2014/0008138 | A1 | 1/2014 | Kim et al. | |

FOREIGN PATENT DOCUMENTS

| | | |
|---|---|---|
| JP | 2008012012 A | 1/2008 |
| JP | 2010-167809 A | 8/2010 |
| JP | 2011045184 A | 3/2011 |
| JP | 5316640 B2 | 10/2013 |

* cited by examiner

| ROTATION ANGLE θ (DEGREES) / TURNING ANGLE \|φ\| (DEGREES) | $\theta_{MIN} - \theta_1$ ($WB_{MIN} - WB_1$) | $\theta_1 - \theta_2$ ($WB_1 - WB_2$) | $\theta_2 - \theta_3$ ($WB_2 - WB_3$) | $\theta_3 - \theta_{MAX}$ ($WB_3 - WB_{MAX}$) |
|---|---|---|---|---|
| 0–2 | 0 | 5.0 | 10.0 | 15.0 |
| 2–20 | 0 | 5.0 | 10.0 | 12.0 |
| 20–40 | 0 | 5.0 | 8.0 | 9.0 |
| 40–80 | 0 | 3.0 | 6.0 | 6.0 |

TARGET SPEED (km/h)

Fig. 10

TRAVELING APPARATUS

CROSS REFERENCE TO RELATED APPLICATIONS

This application is based upon and claims the benefit of priority from Japanese patent application No. 2016-175062, filed on Sep. 7, 2016, the disclosure of which is incorporated herein in its entirety by reference.

BACKGROUND

The present invention relates to a traveling apparatus on which a user rides and that travels.

Nowadays, personal mobility vehicles have been attracting attention. A personal mobility vehicle is often manufactured in a small size in view of maneuverability, which raises a problem that it lacks stability when traveling at a high speed. In order to improve stability of vehicles, including personal mobility vehicles but not limited thereto, vehicles having adjustable wheel base lengths have been suggested (e.g., Japanese Unexamined Patent Application Publication Nos. H1-106717 and 2005-231415).

SUMMARY

Most vehicles with adjustable wheel base lengths, which have heretofore been suggested, have been proposed based on automobiles, although they are personal mobility vehicles. Further, a turning mechanism of these vehicles is not specialized for the personal mobility vehicles. One of the advantages of the personal mobility vehicles is that it achieves good maneuverability even in a narrow space. However, the turning track of the vehicles with adjustable wheel base lengths varies depending on the state of the vehicles and thus the occupant cannot turn the vehicle as he/she desires.

The present invention has been made to solve such a problem and provides a traveling apparatus that allows a user, who is an occupant, to turn as he or she desires even in a narrow space.

A traveling apparatus according to one aspect of the present invention includes a front wheel steered by an operation by a user and two rear wheels that are rotationally driven independently from each other disposed along a traveling direction and on which the user rides when traveling, the traveling apparatus including: a front wheel supporting member configured to rotatably support the front wheel; a rear wheel supporting member configured to rotatably support the rear wheels; an adjusting mechanism configured to adjust a wheel base length between the front wheel and the rear wheels by changing, by the user, a relative position of the front wheel supporting member and the rear wheel supporting member; and a controller configured to control a rotational speed of each of the rear wheels based on the wheel base length and a steering angle of the front wheel in such a way that a moving track of the front wheel and moving tracks of the rear wheels draw a concentric arc.

With such a configuration, by taking into consideration the wheel base length at the time of turning as well, the traveling apparatus moves in such a way that an arc is drawn around one central point by the track of the front wheel steered by the user and each track of the two rear wheels that serve as driving wheels, whereby it is possible to prevent unstable operations in which the direction in which the front wheel is moved differs from the direction in which the rear wheels are moved.

According to the present invention, it is possible to provide a traveling apparatus that allows a user, who is an occupant, to turn as he or she desires even in a narrow space.

The above and other objects, features and advantages of the present invention will become more fully understood from the detailed description given hereinbelow and the accompanying drawings which are given by way of illustration only, and thus are not to be considered as limiting the present invention.

BRIEF DESCRIPTION OF DRAWINGS

FIG. 10 is a table showing a relationship between the rotation angle and the turning angle, and the target speed according to another example.

DESCRIPTION OF EMBODIMENTS

Hereinafter, although the present invention will be described with reference to embodiments of the invention, the invention according to claims is not limited to the following embodiments. Moreover, all the components described in the following embodiments are not necessarily indispensable for means to solve problems.

Figure 1:
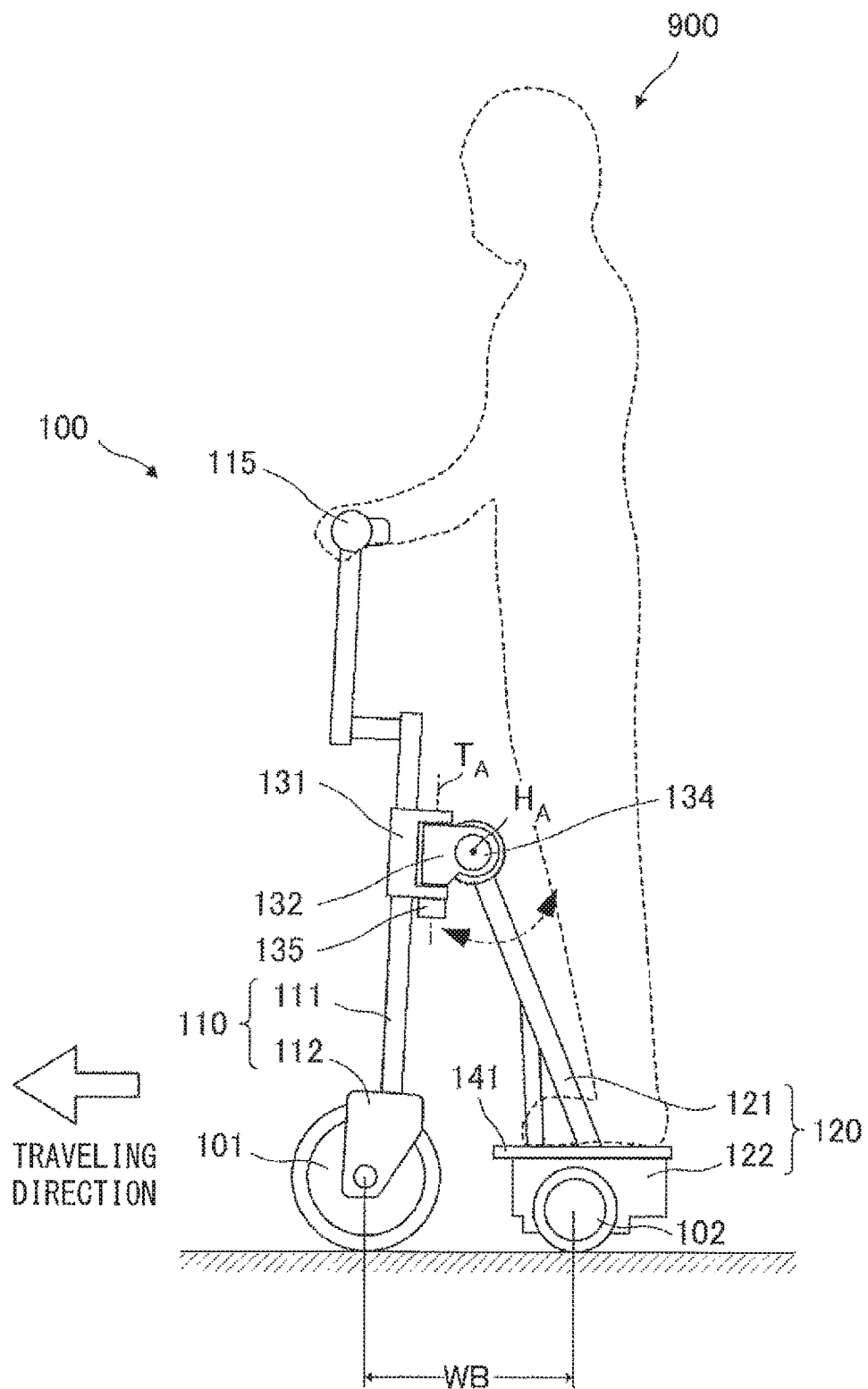
FIG. 1 is a lateral overview diagram of a traveling apparatus according to a first embodiment when it travels at a low speed.
Figure 2:
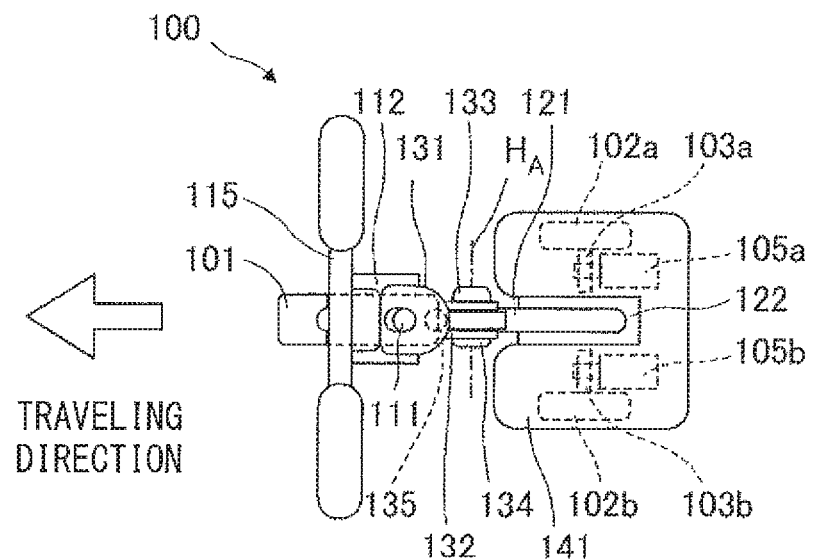
FIG. 2 is a top overview diagram of the traveling apparatus.

FIG. 1 is a lateral overview diagram of a traveling apparatus 100 according to a first embodiment when it travels at a low speed. FIG. 2 is a top lateral diagram of the traveling apparatus 100 that is in the state shown in FIG. 1 when the traveling apparatus 100 is viewed from above. In FIG. 2, a user 900, who is illustrated by the dotted line in FIG. 1, is not shown.

The traveling apparatus 100 is one kind of personal mobility vehicle and is an electrically operated mobile vehicle in which a user stands when he or she rides on the traveling apparatus 100. The traveling apparatus 100 includes, with respect to the traveling direction, one front wheel 101 and two rear wheels 102 (right rear wheel 102a and left rear wheel 102b). An orientation of the front wheel 101 is changed when the user 900 operates a handlebar 115. The front wheel 101 functions as a steering wheel. The right rear wheel 102a and the left rear wheel 102b are driving wheels that are rotationally driven independently from each other. The right rear wheel 102a is driven by a right motor 105a via a deceleration mechanism and the left rear wheel 102b is driven by a left motor 105b via the deceleration mechanism. A right wheel axis 103a, which is a wheel axis of the right rear wheel 102a, and a left wheel axis 103b, which is a wheel axis of the left rear wheel 102b, are disposed in such a way that the axes coincide with each other. The traveling apparatus 100 is grounded at three points by the three wheels and is a statically stable vehicle that is self-supported even when the traveling apparatus 100 is parked without the user 900 riding thereon.

The front wheel 101 is rotatably supported by a front wheel supporting member 110. The front wheel supporting member 110 includes a front pole 111 and a fork 112. The fork 112 is fixed to one end of the front pole 111 and sandwiches the front wheel 101 to rotatably support the front wheel 101 on both of its sides. The handlebar 115 is extended in the rotation axis direction of the front wheel 101 and fixed to the other end of the front pole 111. When the user 900 turns the handlebar 115, the front pole 111 sends a force of the operation to the front wheel 101 to change its orientation.

The two rear wheels 102 are rotatably supported by a rear wheel supporting member 120. The rear wheel supporting member 120 includes a rear pole 121 and a body part 122. The body part 122 fixes and supports one end of the rear pole 121. Further, the body part 122 rotatably supports the right rear wheel 102a via the right wheel axis 103a and the left rear wheel 102b via the left wheel axis 103b. The body part 122 also functions as a housing that accommodates the above-mentioned right motor 105a and the left motor 105b, the deceleration mechanism, and a battery etc., that supplies power to the motors. A step 141, for the user 900 to place his or her feet on, is provided on the upper surface of the body part 122.

The front wheel supporting member 110 and the rear wheel supporting member 120 are coupled to each other with a pivot joint 131 and a hinge joint 132 interposed therebetween. The pivot joint 131 is fixed to the front pole 111 that constitutes the front wheel supporting member 110 at a position near the other end of the front pole 111 to which the handlebar 115 is fixed. Further, the pivot joint 131 is pivotally arranged on the hinge joint 132 and rotates in relation to the hinge joint 132 around a pivot axis $T_A$, which is disposed parallel to the direction in which the front pole 111 is extended. The hinge joint 132 is pivotally arranged on one end of the rear pole 121, which constitutes the rear wheel supporting member 120, that is opposite to an end of the rear pole 121 supported by the body part 122. The hinge joint 132 rotates in relation to the rear pole 121 around a hinge axis $H_A$, which is disposed parallel to the direction in which the wheel axis 103 is extended.

With such a structure, when the user 900 turns the handlebar 115, the front wheel supporting member 110 revolves around the pivot axis $T_A$ with respect to the rear wheel supporting member 120, so that the orientation of the front wheel 101 can be changed. Moreover, when the user 900 tilts the handlebar 115 forward with respect to the traveling direction, the motion by the user 900 causes rotation of the front wheel supporting member 110 and the rear wheel supporting member 120 in relation to each other around the hinge axis $H_A$, so that an angle formed by the front pole 111 and the rear pole 121 can be made smaller. When the angle formed by the front pole 111 and the rear pole 121 is made small, a WB length, which is a distance of a wheel base (WB) between the front wheel 101 and the rear wheels 102 becomes shorter. On the contrary, when the user 900 tilts the handlebar 115 backward with respect to the traveling direction, the front wheel supporting member 110 and the rear wheel supporting member 120 rotate in relation to each other around the hinge axis $H_A$, so that the angle formed by the front pole 111 and the rear pole 121 can be made larger. When the angle formed by the front pole 111 and the rear pole 121 increases, the WB length increases. That is, the user 900 is able to decrease or increase the WB length by applying his/her motion as a rotational force.

A biasing spring 133 is provided near the hinge joint 132. The biasing spring 133 exerts a biasing force on the hinge axis $H_A$ in the rotation direction that reduces the angle formed by the front pole 111 and the rear pole 121. The biasing spring 133 is, for example, a torsion spring. The biasing force of the biasing spring 133 changes the angle formed by the front pole 111 and the rear pole 121 to be structurally the smallest angle when the user 900 is not in contact with the handlebar 115. On the other hand, the biasing force of the biasing spring 133 is configured in such a degree as to enable the user 900 to easily tilt the handlebar 115 backward with respect to the traveling direction. Accordingly, the user 900 can adjust the angle formed by the front pole 111 and the rear pole 121 and thus the WB length by changing at least one of a weight on the handlebar 115 and a weight on the step 141. That is, the mechanism that connects the front pole 111 and the rear pole 121 via the hinge joint 132 serves as an adjusting mechanism in which the user 900 adjusts the WB length.

A rotation angle sensor 134 is provided near the hinge joint 132. The rotation angle sensor 134 outputs the angle formed by the front pole 111 and the rear pole 121 around the hinge axis $H_A$. The rotation angle sensor 134 is, for example, a rotary encoder. An output from the rotation angle sensor 134 is sent to a controller, which will be described later.

In a similar way, a turning angle sensor 135 is provided near the pivot joint 131. The turning angle sensor 135 outputs the angle formed by the front pole 111 and the rear pole 121 around the pivot axis $T_A$. The turning angle sensor 135 is, for example, a rotary encoder. An output from the turning angle sensor 135 is sent to the controller, which will be described later.

Figure 3:
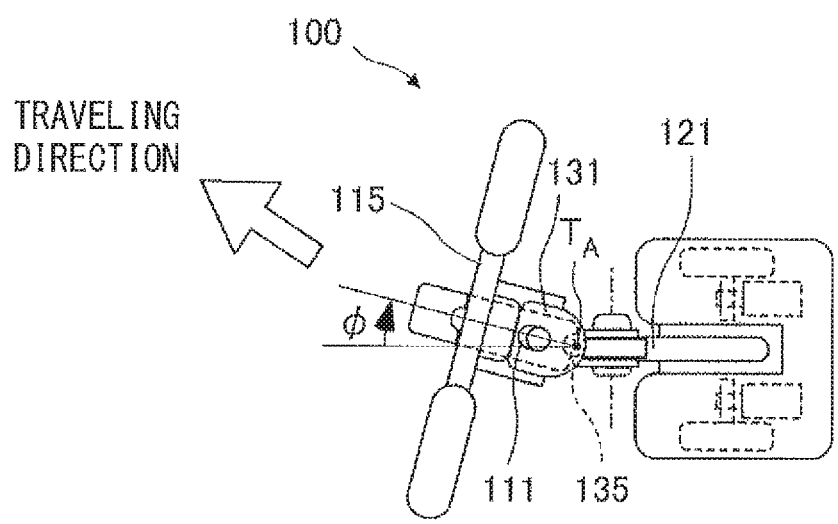
FIG. 3 is a top overview diagram showing a state in which the traveling apparatus turns.

FIG. 3 is a top overview diagram showing a state in which the traveling apparatus 100 turns. When the user 900 turns the handlebar 115, the front pole 111 that is directly connected to the handlebar 115 also turns following the handlebar 115. The front pole 111 is rotatably coupled to the rear pole 121 via the pivot joint 131. Therefore, the turning angle sensor 135 outputs a turning angle φ shown in FIG. 3, the pivot axis $T_A$ serving as a rotation center.

The traveling apparatus 100 travels while changing its orientation in the direction in accordance with the turning angle φ. When the turning angle becomes greater, the turning radius becomes smaller and the user 900, who is the occupant, receives a large centrifugal force. Even when the turning angle is constant, the centrifugal force that the user 900 receives increases as the traveling speed increases.

When the straight forward direction is expressed by φ=0, the turning angle sensor 135 outputs a positive angle when the traveling apparatus 100 turns to the right with respect to the straight forward direction and outputs a negative angle when the traveling apparatus 100 turns to the left. A state in which the turning angle is large, for example, is expressed using an absolute value |φ|. Further, as one example, the traveling apparatus 100 according to this embodiment is turned in a range of φ=±80 degrees.

The traveling apparatus 100 in this embodiment decelerates when the user 900 increases the turning angle |φ| and accelerates when the user 900 reduces the turning angle |φ|.

That is, the target speed is associated with the turning angle $|\varphi|$ and a change in the turning angle $|\varphi|$ causes the traveling apparatus 100 to accelerate/decelerate in order to reach the target speed.

Figure 4:
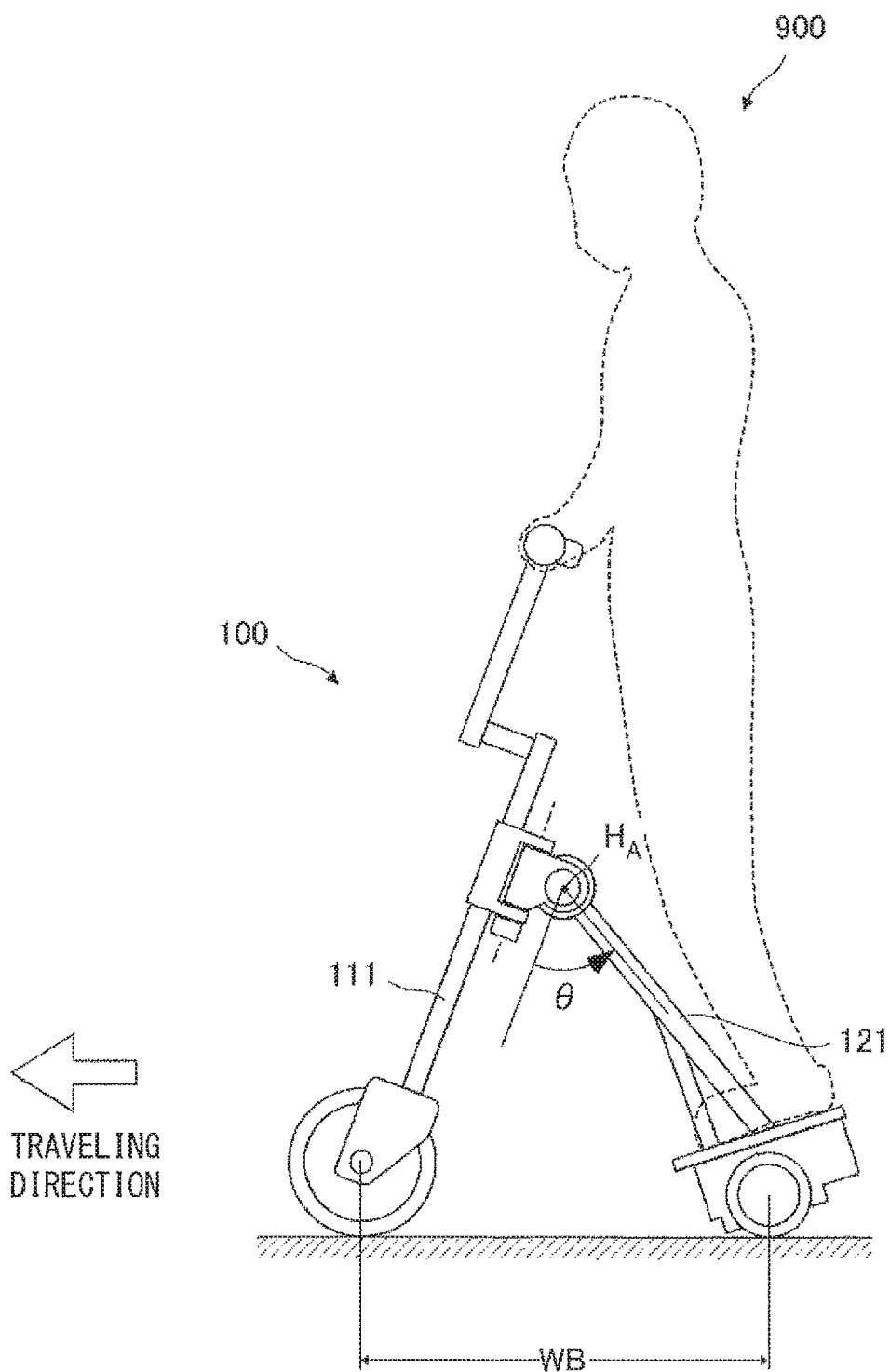
FIG. 4 is a lateral overview diagram of the traveling apparatus when it travels at a high speed.

The traveling apparatus 100 travels at a low speed when the WB length is short and travels at a high speed when the WB length is long. FIG. 1 shows a state of the traveling apparatus 100 traveling at a low speed with a short WB length. FIG. 4 is a lateral overview diagram of the traveling apparatus 100 shown in FIG. 1 and shows a state of the traveling apparatus 100 traveling at a high speed with a long WB length.

As shown in the drawings, a direction in which the angle formed by the front pole 111 and the rear pole 121 relatively increases shall be positive, and a rotation angle shall be $\theta$. Further, a minimum value the rotation angle $\theta$ can take (minimum angle) shall be $\theta_{MIN}$, and a maximum value the rotation angle $\theta$ can take (maximum angle) shall be $\theta_{MAX}$. For example, $\theta_{MIN}$ is 10 degrees, and $\theta_{MAX}$ is 80 degrees. In other words, a structural control member is provided so that the rotation angle $\theta$ falls within a range between $\theta_{MIN}$ and $\theta_{MAX}$.

The WB length corresponds one-to-one to the rotation angle $\theta$ and can be calculated by the function, WB length=f ($\theta$). Therefore, the WB length can be adjusted by changing the rotation angle $\theta$. The traveling apparatus 100 in this embodiment accelerates when the user 900 increases the rotation angle $\theta$ and decelerates when the user 900 reduces the rotation angle $\theta$. That is, besides that the target speed is associated with the turning angle $|\varphi|$, the target speed is also associated with the rotation angle $\theta$, and a change in the rotation angle $\theta$ causes the traveling apparatus 100 to accelerate/decelerate in order to reach the target speed associated with the changed rotation angle. In other words, the rotation angle $\theta$ is used as a parameter to associate the WB length with the target speed, and when the user 900 adjusts the WB length, the target speed is changed according to the adjusted WB length.

When the rotation angle $\theta$ is reduced, the WB length becomes shorter, thereby improving maneuverability. That is, the traveling apparatus 100 can move around in a narrow space. On the contrary, when the rotation angle $\theta$ is increased, the WB length becomes longer, thereby improving travel stability, in particular, straight drivability. That is, the traveling apparatus 100 is less susceptible to sway caused by bumps and the like on the road even when traveling at a high speed. As the WB length is changed in conjunction with a change in the speed, the WB length will not be long when the traveling apparatus 100 is traveling at a low speed, and thus the traveling apparatus 100 can move in a projected area minimal at the low speed. That is, an area on the road necessary for the traveling apparatus 100 to travel in is small without requiring an excess area. This effect is especially pronounced when the traveling apparatus 100 is parked. As the user 900 can change both the speed and WB length in conjunction with each other when he or she tilts the handlebar 115 forward and backward, the driving operation is easy and simple.

As described above, the user 900 is able to independently perform the adjustment of the WB length and the adjustment of the turning angle $\varphi$ by operating the handlebar 115. That is, the user 900 is able to either turn the traveling apparatus 100 in a state in which the WB length is made long or turn it in a state in which the WB length is made short. Further, regardless of the WB length, the user 900 is able to gently curve the traveling apparatus 100 by slightly turning the handlebar 115 or change directions by sharply turning the handlebar 115. In this way, when the WB length and the turning angle have various values independently from each other, the rotation of the driving wheels needs to be appropriately controlled in accordance with the situation. Unless the rotation of the driving wheels is appropriately controlled, the direction in which the front wheel travels differs from the direction in which the rear wheels travel, which causes unstable operations that are contrary to the user's desire. Then the traveling apparatus 100 according to this embodiment controls the rotation of the driving wheels in accordance with the WB length and the turning angle $\varphi$. These controls will be described in order.

Figure 5A:
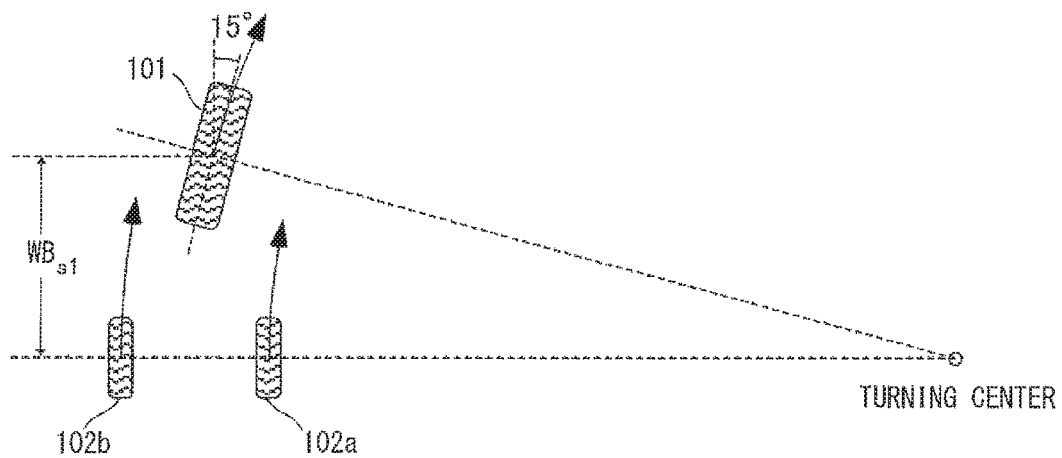
FIGS. 5A, 5B and 5C are diagrams for describing a relationship between a turning angle and a turning center when a WB length is constant.
Figure 5B:
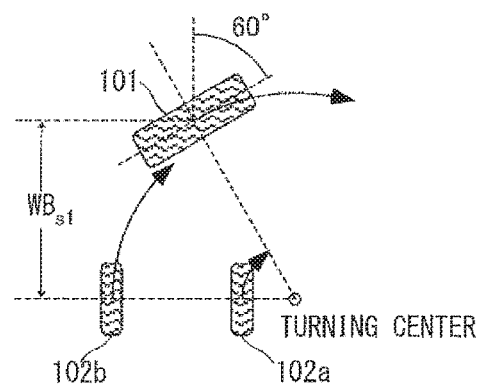
Figure 5C:
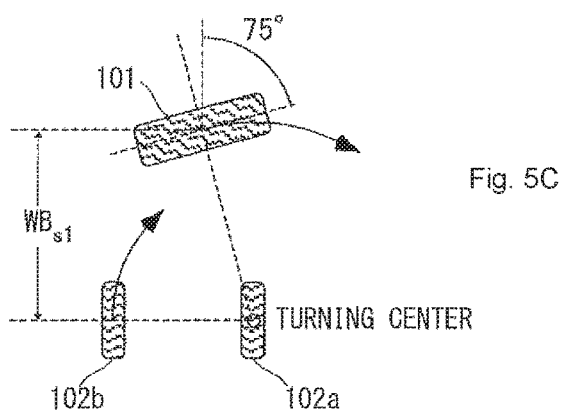

FIGS. 5A, 5B and 5C are diagrams for describing a relationship between the turning angle and the turning center when the WB length is constant. FIGS. 5A, 5B and 5C schematically show the relative positional relationship among the front wheel 101, the right rear wheel 102a, and the left rear wheel 102b and the orientations thereof when the traveling apparatus 100 is viewed from above.

FIGS. 5A, 5B, and 5C each show a state in which the handlebar 115 is turned in a state in which the WB length is $WB_{S1}$. The turning angle $\varphi$ of the front wheel 101 is 15 (degrees) in the state shown in FIG. 5A, 60 (degrees) in the state shown in FIG. 5B, and 75 (degrees) in the state shown in FIG. 5C. In this embodiment, the WB length is the distance between the center of the front wheel 101 and the rear wheel axis along the direction perpendicular to the rear wheel axis, which is a rotation center of the two rear wheels 102. While a change in the turning angle $\varphi$ causes a change in the ground-contact point of the traveling surface with the front wheel 101 in accordance with the amount of offset of the front pole 111 and the rotation axis of the front wheel 101 in an actual traveling apparatus, a ground-contact point of the front wheel is not changed in this example at any turning angle in order to facilitate understanding.

As shown in FIG. 5A, when the turning angle $\varphi$ is relatively small, the turning center, defined to be the point at which the front wheel axis, which is the center of the rotation axis of the front wheel 101, and the rear wheel axis intersect with each other, is relatively spaced apart from the traveling apparatus 100. That is, the turning radius is relatively large. As shown in FIG. 5B, when the turning angle $\varphi$ increases, the turning center comes closer to the right rear wheel 102a and the turning radius becomes smaller. When the turning angle $\varphi$ further increases, the turning center eventually coincides with the ground-contact point of the right rear wheel 102a, as shown in FIG. 5C.

If the right rear wheel 102a and the left rear wheel 102b are rotated at the same rotational speed, the rear wheels 102 tend to move straight ahead and the front wheel 101 tends to make a turn. Therefore, when the turning angle $\varphi$ is large as shown in FIG. 5C, the rotation of the front wheel 101 is locked, which prevents smooth turning. Even in the cases shown in FIGS. 5A and 5B, the traveling apparatus 100 cannot move along the turning track as desired by the user. That is, in order to cause each of the front wheel 101, the right rear wheel 102a, and the left rear wheel 102b to turn along the track of the concentric arc having a turning center as a central point as shown by the arc-shaped arrow, each of the rotational speed of the right rear wheel 102a and that of the left rear wheel 102b needs to be adjusted in accordance with the turning radius.

Figure 6A:
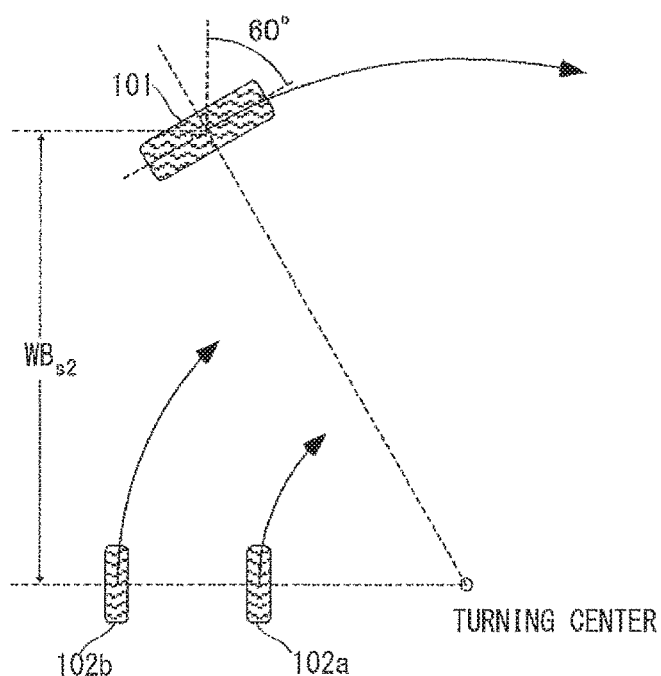
FIGS. 6A, 6B and 6C are diagrams for describing a relationship between the WB length and the turning center when the turning angle is constant.
Figure 6B:
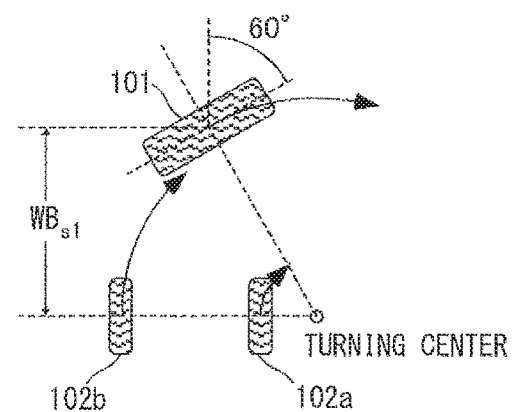
Figure 6C:
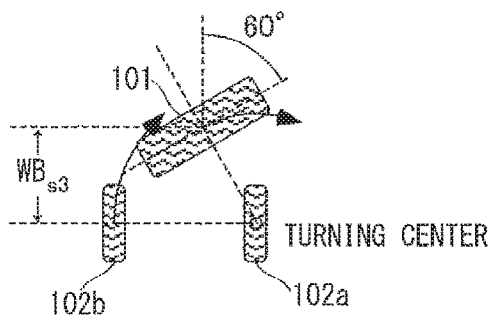

The aforementioned relationship is applied not only to the case in which the turning angle $\varphi$ is changed while the WB length is kept constant, but also to the case in which the traveling apparatus 100 is turned while the WB length is changed. FIGS. 6A, 6B and 6C are diagrams for describing a relationship between the WB length and the turning center when the turning angle φ is constant. Similar to FIGS. 5A, 5B and 5C, FIGS. 6A, 6B and 6C also schematically show the relative positional relationship among the front wheel 101, the right rear wheel 102a, and the left rear wheel 102b and the orientations thereof when the traveling apparatus 100 is viewed from above.

FIGS. 6A, 6B, and 6C each show a state in which the turning angle φ is 60 degrees. The state shown in FIG. 6B is the same as the state shown in FIG. 5B. The WB length is $WB_{S2}$, which is longer than $WB_{S1}$, in the state shown in FIG. 6A and is $WB_{S3}$, which is shorter than $WB_{S1}$, in the state shown in FIG. 6C.

As shown in FIG. 6A, when the WB length is relatively long, the turning center is relatively spaced apart from the traveling apparatus 100. That is, the turning radius is relatively large. As shown in FIG. 6B, when the WB length decreases, the turning center comes closer to the right rear wheel 102a and the turning radius becomes smaller. When the WB length further decreases, the turning center eventually coincides with the ground-contact point of the right rear wheel 102a, as shown in FIG. 6C.

That is, in order to cause each of the front wheel 101, the right rear wheel 102a, and the left rear wheel 102b to turn along the track of the concentric arc having a turning center as a central point as shown by the arc-shaped arrow, it is required to adjust each of the rotational speed of the right rear wheel 102a and that of the left rear wheel 102b in accordance with the turning radius not only in the case in which the turning angle φ is changed but also in the case in which the WB length is changed. While a case in which the traveling apparatus 100 turns to the right (the turning angle φ has a positive value) has been described in FIGS. 5 and 6, the rotational speed also needs to be adjusted in accordance with the turning radius in a case in which the traveling apparatus 100 turns to the left as well (the turning angle φ has a negative value).

As described above, one advantage of the personal mobility vehicle which can reduce the WB length is that it achieves good maneuverability even in a narrow space. The advantage of good maneuverability is brought about by a structural characteristic that the turning angle φ can be increased and the turning radius can be decreased. In other words, smooth turning movement needs to be achieved even when the turning angle φ is increased and the turning radius is decreased. However, in the device structure in which the turning radius is changed considerably as stated above, a differential device that uses a differential gear used for normal vehicles cannot sufficiently adjust the rotational difference between the inner ring and the outer ring. In particular, the normal differential device cannot address pivot turn, which is turning while the rotation on the inner wheel side is being stopped, as shown in FIGS. 5C and 6C. In order to address this problem, the traveling apparatus 100 according to this embodiment executes control for rotationally driving the right rear wheel 102a and the left rear wheel 102b, which are the driving wheels, independently from each other.

Figure 7:
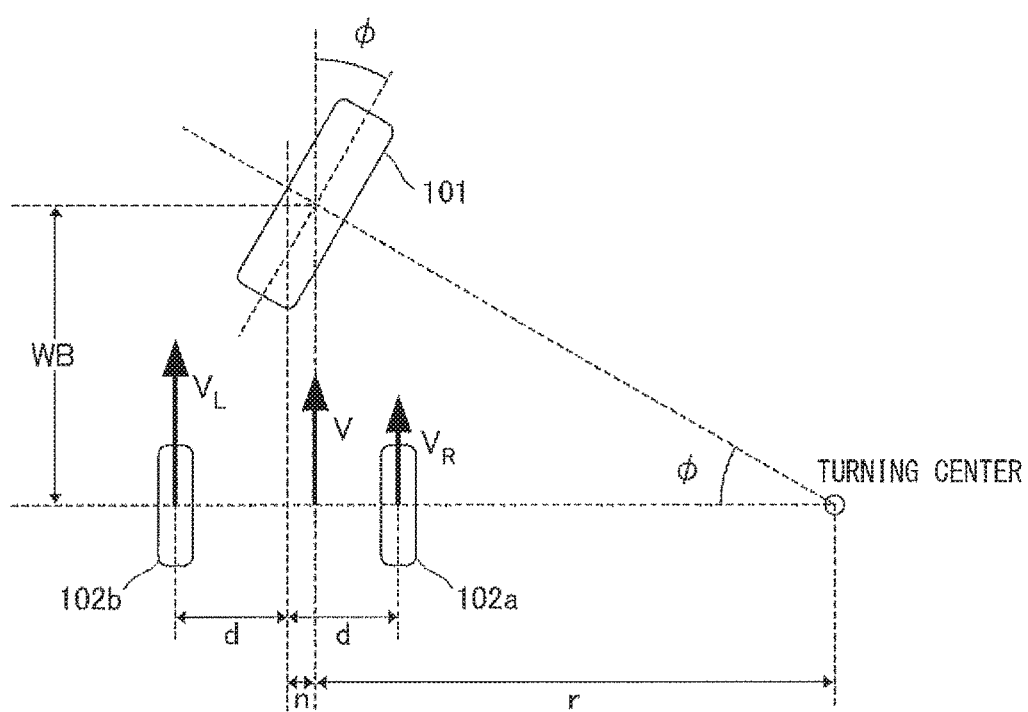
FIG. 7 is a diagram for describing derivation of a rotational speed of driving wheels.

FIG. 7 is an explanatory diagram for describing a procedure for deriving the rotational speed of the right rear wheel 102a and that of the left rear wheel 102b. Like FIGS. 5 and 6, FIG. 7 schematically shows the relative positional relationship among the front wheel 101, the right rear wheel 102a, and the left rear wheel 102b and the orientations thereof in one state when the traveling apparatus 100 is viewed from above. In this example, the reference point of the traveling apparatus 100 is defined to be the midpoint between the right rear wheel 102a and the left rear wheel 102b.

In FIG. 7, d denotes the distance between the reference point and the right rear wheel 102a and between the reference point and the left rear wheel 102b. That is, d is half the length of the tread. The symbol n is an amount of displacement along the rear wheel axis between the reference point and the center of the front wheel 101. The symbol r denotes the turning radius and is defined to be the length from the turning center to the center of the front wheel 101 along the rear wheel axis in this example. The symbol V denotes the speed in the tangential direction in the turning radius. The symbol $V_R$ denotes the speed in the tangential direction at the ground-contact point of the right rear wheel 102a and $V_L$ denotes the speed in the tangential direction at the ground-contact point of the left rear wheel 102b.

When the turning angle speed of the traveling apparatus 100 is denoted by ω, the following expressions are obtained.

$$V=r\omega \quad (1)$$

$$V_L=(r+(d+n))\omega \quad (2)$$

$$V_R=(r-(d-n))\omega \quad (3)$$

Further, since the turning radius is expressed by the following expression $$r=WB/\tan\varphi \quad (4),$$

the Expressions (2) and (3) can be expressed by the following expressions using Expressions (1) and (4).

$$V_L=V+(d+n)(\tan\varphi/WB)V \quad (5)$$

$$V_R=V-(d-n)(\tan\varphi/WB)V \quad (6)$$

From the expressions (5) and (6), it can be regarded that the first term on the right side is a speed component with respect to a translation command and the second term on the right side is a speed component with respect to a turning command. The turning angle φ can be obtained from the output of the turning angle sensor 135 and WB can be calculated using the output of the rotation angle sensor 134. Further, d is a value defined from the vehicle body structure and n is a value calculated from the vehicle body structure, φ, and θ. Therefore, when the first term is given as the target speed at the time of turning, the controller is able to calculate the speed command value of the right rear wheel 102a and that of the left rear wheel 102b by adding or subtracting the value corresponding to the second term calculated based on the WB length and the turning angle φ to or from the target speed.

Furthermore, by dividing the speed command value of the right rear wheel 102a and that of the left rear wheel 102b by the radius of each of the wheels, the target rotational speed of the right rear wheel 102a and that of the left rear wheel 102b can be calculated. The controller generates driving signals for driving the right motor 105a and the left motor 105b to follow the target rotational speed that has been calculated.

When the controller generates the driving signals and controls the driving wheels, the user 900 is able to move the traveling apparatus 100 in such a way that a concentric arc having a turning center as a central point is drawn by the moving track of the front wheel 101 and the moving tracks of the rear wheels 102. That is, the user 900, who is the occupant, is able to turn the traveling apparatus 100 as he/she desires with no feeling of strangeness. In particular, even in an operation of suddenly turning the traveling apparatus 100 in a narrow space, the user 900 is able to smoothly turn the traveling apparatus 100.

Figure 8:
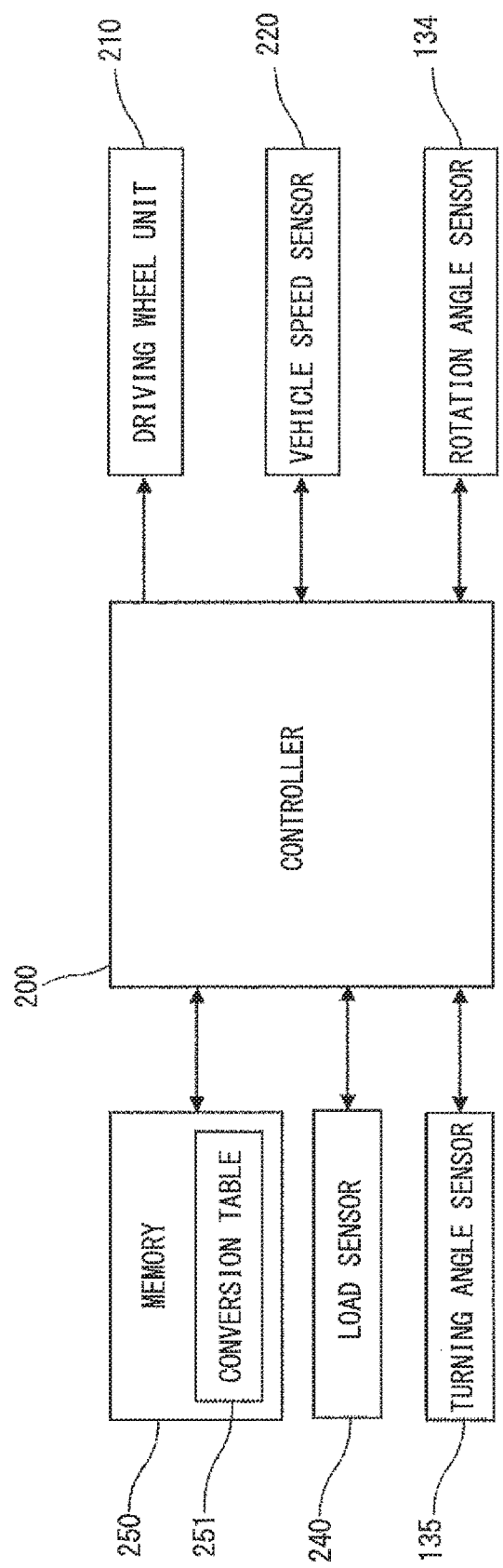
FIG. 8 is a control block diagram of the traveling apparatus.

FIG. 8 is a control block diagram of the traveling apparatus 100. A controller 200 is, for example, a CPU and is accommodated inside the body part 122. A driving wheel unit 210 includes a driving circuit and a motor for driving the rear wheels 102, which are driving wheels. The driving wheel unit 210 is accommodated inside the body part 122. The controller 200 sends the driving signals to the driving wheel unit 210 to thereby control the rotations of the rear wheels 102, as stated above.

A vehicle speed sensor 220 detects, in response to a request from the controller 200, an amount of the rotation of the right rear wheel 102a and that of the left rear wheel 102b and sends the result of the detection to the controller 200 as a speed signal. The controller 200 calculates the translational speed corresponding to the aforementioned V from the speed signal that has been received. The rotation angle sensor 134 detects the rotation angle $\theta$ as described above. The rotation angle sensor 134 sends, in response to a request from the controller 200, the result of the detection to the controller 200 as a rotation angle signal. The turning angle sensor 135 detects the turning angle $\varphi$ as descried above. The turning angle sensor 135 sends, in response to a request from the controller 200, the result of the detection to the controller 200 as a turning angle signal.

A load sensor 240 is, for example, a piezoelectric film that detects a load applied on the step 141, and is embedded in the step 141. In response to a request from the controller 200, the load sensor 240 sends the result of the detection as a load signal to the controller 200.

A memory 250 is a non-volatile storage medium and is, for example, a solid state drive. The memory 250 stores not only a control program for controlling the traveling apparatus 100 but also various parameter values, functions, lookup tables, and the like used for the control. The memory 250 stores a conversion table 251 for converting the rotation angle $\theta$ and the turning angle $|\varphi|$ into the target speed.

Figure 9:
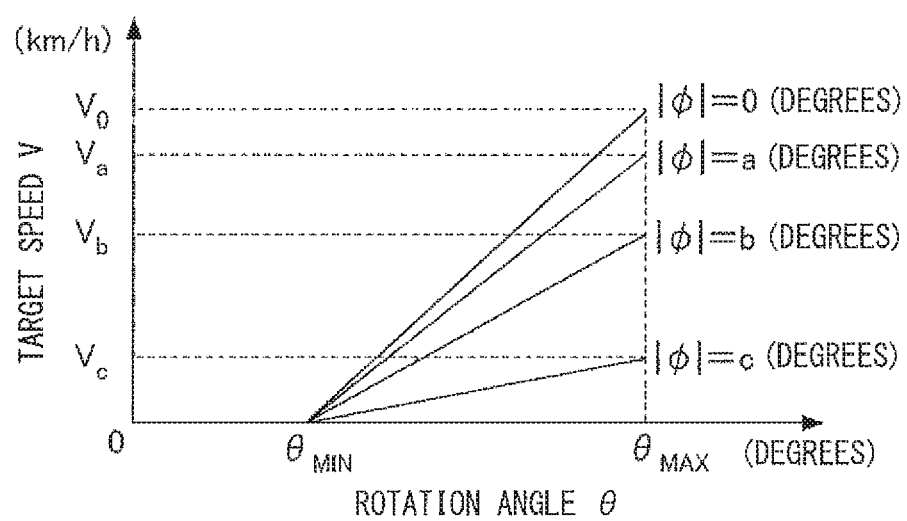
FIG. 9 is a graph showing a relationship between a rotation angle and a turning angle, and a target speed.

FIG. 9 is a graph showing a relationship between the rotation angle $\theta$ and the turning angle $|\varphi|$, and the target speed V as an example of the conversion table 251 for converting the rotation angle $\theta$ and the turning angle $|\varphi|$ into the target speed. As shown in FIG. 9, the target speed V is expressed as a linear function of the rotation angle $\theta$ defined for each turning angle $|\varphi|$. The target speed is configured to become greater as the rotation angle $\theta$ increases for each turning angle $|\varphi|$. When the turning angle $|\varphi|$ is 0 degree, for example, the target speed becomes 0 when the minimum angle is $\theta_{MIN}$ (degrees) and the target speed becomes the maximum speed $V_0$ (km/h) when the maximum angle is $\theta_{MAX}$ (degrees).

The symbols a, b, and c in FIG. 9 have a relationship of $0<a<b<c$. In any turning angle, the target speed when the rotation angle $\theta$ is the minimum angle $\theta_{MIN}$ (degrees) is 0 and the linear functions for the respective turning angles all pass $(\theta, V)=(\theta_{MIN}, 0)$. The target speed of the maximum angle $\theta_{MAX}$ (degrees) when $|\varphi|=a$ is $V_a$, the target speed of the maximum angle $\theta_{MAX}$ (degrees) when $|\varphi|=b$ is $V_b$, and the target speed of the maximum angle $\theta_{MAX}$ (degrees) when $|\varphi|=c$ is $V_c$. At this time, a relationship of $V_0>V_a>V_b>V_c>0$ is established. That is, the maximum speed as the target speed is configured to become smaller as the turning angle $|\varphi|$ increases. Further, since the relationship between the rotation angle $\theta$ and the target speed V for each turning angle $|\varphi|$ is the linear function, in a desired rotation angle $\theta$ larger than $\theta_{MIN}$, a relationship in which the target speed decreases as the turning angle $|\varphi|$ increases is established when the rotation angle $\theta$ is constant.

By associating the rotation angle and the turning angle with the target speed in advance by the aforementioned relational expressions, the traveling speed automatically increases as the WB length increases when the turning angle is constant. Therefore, both good maneuverability when traveling at a low speed and stability when traveling at a high speed can be achieved. Further, when the WB length is constant, the traveling speed becomes automatically smaller as the turning angle increases. Therefore, the rider does not lose his/her balance due to centrifugal force and it is thus possible to achieve safe riding.

While the case in which the turning angle $|\varphi|$ has four values 0, a, b, and c has been described with reference to FIG. 9, linear functions may be naturally defined for five or more turning angles $|\varphi|$. Further, various functions other than the linear function may be applied. Further, the target speed V may be defined by a function of two variables $f(\theta, \varphi)$.

The target speed V is set as a speed component V with respect to the translation command described with reference to FIG. 7. Therefore, the target rotational speed of the right rear wheel 102a and that of the left rear wheel 102b are calculated based on the aforementioned expressions (5) and (6) using the target speed V.

FIG. 10 is a table showing a relationship between the rotation angle $\theta$ and the turning angle $|\varphi|$, and the target speed as another example of the conversion table 251 for converting the rotation angle $\theta$ and the turning angle $|\varphi|$ into the target speed. In the example of FIGS. 6A, 6B and 6C, the continuously varying target speed is associated with the continuously varying rotation angle $\theta$. In the example of FIG. 7, a two-dimensional lookup table in which the continuously varying rotation angle $\theta$ and the continuously varying turning angle $|\varphi|$ are each divided into a plurality of groups and one target speed is associated with each of the plurality of groups is configured.

As shown in FIG. 10, in a range in which the turning angle $|\varphi|$ is between 0 degree or greater and less than 2 degrees, for example, the target speed 0 (km/h) is associated with the group of rotation angles $\theta$ in the range between $\theta_{MIN}$ or greater and less than $\theta_1$, the target speed 5.0 (km/h) is associated with the group of rotation angles $\theta$ in the range between $\theta_1$ or greater and less than $\theta_2$, the target speed 10.0 (km/h) is associated with the group of rotation angles $\theta$ in the range between $\theta_2$ or greater and less than $\theta_3$, and the target speed 15.0 (km/h) is associated with the group of rotation angles $\theta$ in the range between $\theta_3$ or greater and less than $\theta_{MAX}$. The turning angle $|\varphi|$ is divided, following the range between 0 degree or greater and less than 2 degrees, into the ranges between 2 degrees or greater and less than 20 degrees, between 20 degrees or greater and less than 40 degrees, and between 40 degrees or greater and 80 degrees (=maximum turning angle) or smaller, and the target speed is also associated with each range of the rotation angle in each range of turning angle as well.

The lookup table shown in FIG. 10 is set in such a way that the target speed that is associated with the first range of the rotation angle $\theta$ does not exceed the target speed that is associated with the second range greater than the first range as long as the range of the turning angle $|\varphi|$ is the same. Further, the aforementioned lookup table is set in such a way that the target speed that is associated with the first range of the turning angle $|\varphi|$ does not exceed the target speed that is associated with the second range smaller than the first range as long as the range of the rotation angle θ is the same.

When the range of the turning angle |φ| is between 40 degrees or greater and 80 degrees or smaller, for example, 3.0 (km/h) is associated with the range between $θ_1$ or greater and less than $θ_2$, which does not exceed 6.0 (km/h) associated with the range between $θ_2$ or greater and less than $θ_3$. Further, when the range of the rotation angle θ is between $θ_2$ or greater and less than $θ_3$, 10.0 (km/h) is associated with the range in which the turning angle |φ| is between 2 degrees or greater and less than 20 degrees, which does not exceed 10.0 (km/h) associated with the range in which the turning angle |φ| is between 0 or greater and less than 2 degrees.

Like in the above example, when the target speed is associated with somewhat broad ranges of the rotation angles θ and the turning angles |φ|, the target speed will not change little by little, for example, as a result of being affected by swinging of the user 900's body, and it is thus expected that the speed will be smoothly changed. It is obvious that hysteresis may be included in the boundaries between the above ranges, and by setting different boundaries of the ranges at the time of acceleration and deceleration, it is expected that the speed will be changed more smoothly.

Further, in the example shown in the drawings, when the turning angle |φ| is smaller than 2 degrees, it is regarded that the user desires to move straight forward and the target speed is set in accordance therewith. According to such a configuration, the user is able to keep the speed at which the traveling apparatus 100 moves straight ahead constant even when the handlebar 115 becomes somewhat unstable. Further, a rate of the reduction in the target speed with respect to the increase in the turning angle |φ| becomes larger as the rotation angle θ increases. According to such a configuration, the user can easily maintain a balance with respect to the centrifugal force that is generated at the time of turning.

The association of the rotation angle θ and the turning angle |φ| with the target speed is not limited to those in the examples of FIGS. 9 and 10, and various other associations may be formed. Further, while the conversion table 251 in which, not the WB length, but the rotation angle θ, which is a parameter, is associated with the target speed is employed in the traveling apparatus 100 according to this embodiment since the rotation angle θ corresponds one-to-one to the WB length, a conversion table in which the WB length and the turning angle |φ| are associated with the target speed may be employed as originally intended. In this case, after the rotation angle θ obtained from the rotation angle sensor 134 is converted into the WB length using the aforementioned function, the conversion table may be referred to. Regardless whether the conversion table which is in the form of a function is employed or the conversion table which is in the form of a lookup table is employed, the first target speed associated with the first WB length is configured in such a way that it does not exceed the second target speed associated with the second WB length longer than the first WB length as long as the turning angle is constant and the third target speed associated with the first turning angle is configured in such a way that it does not exceed the fourth target speed associated with the second turning angle smaller than the first turning angle as long as the WB length is constant.

Figure 11:
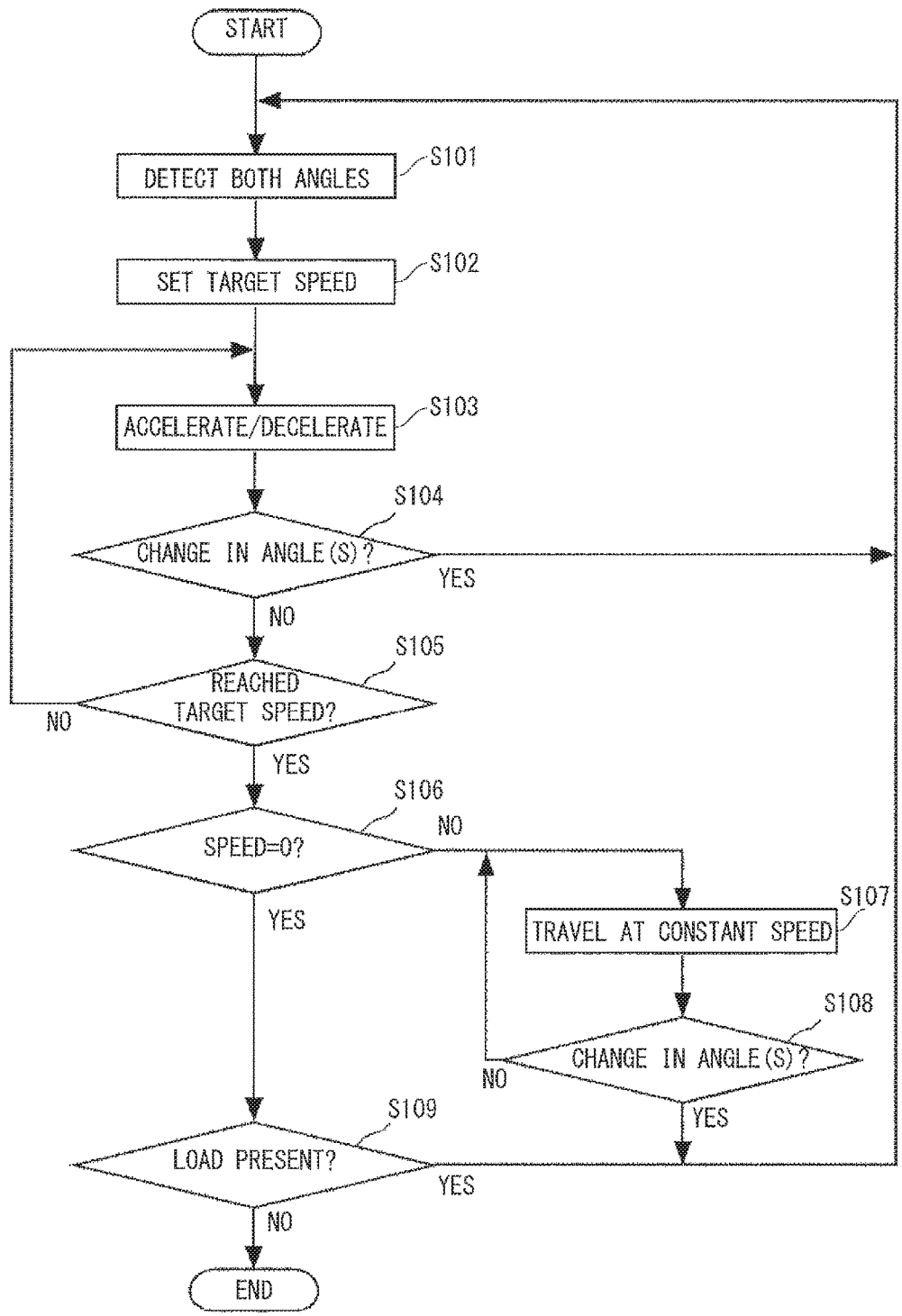
FIG. 11 is a flowchart showing a process while the traveling apparatus is traveling.

Next, a traveling process according to this embodiment will be described. FIG. 11 is a flowchart showing a process while the traveling apparatus is traveling. The flow starts when a power switch is turned on and a signal indicating a load is present is received from the load sensor 240, i.e., when the user 900 rides on the traveling apparatus 100.

In Step S101, the controller 200 obtains the rotation angle signal from the rotation angle sensor 134 to calculate the current rotation angle θ. Further, the controller 200 obtains the turning angle signal from the turning angle sensor 135 to calculate the current turning angle |φ|. In Step S102, the calculated rotation angle θ and turning angle |φ| are applied to the conversion table 251, which has been read out from the memory 250, to set the target speed.

When the controller 200 sets the target speed, it proceeds to Step S103, where the controller 200 generates the driving signals of the right rear wheel 102*a* and the left rear wheel 102*b* as stated above and sends the driving signals to the driving wheel unit 210. When the target speed is greater than the current speed, the controller 200 accelerates. When the target speed is smaller than the current speed, the controller 200 decelerates.

The controller 200 monitors whether the rotation angle θ and the turning angle |φ| have been changed during acceleration or deceleration, that is, whether the user 900 has tilted the handlebar 115 in the front-back or right-left direction (Step S104). When the controller 200 determines that at least one of the rotation angle θ and the turning angle |φ| has been changed, it starts the process from Step S101 again.

When the controller 200 determines that both the rotation angle θ and the turning angle |φ| have not been changed, it proceeds to Step S105. Note that when the conversion table shown in FIG. 7 is employed, if changes in the rotation angle θ or the turning angle |φ| are within one range, it is determined that the rotation angle θ or the turning angle |φ| has not changed.

In Step S105, the controller 200 receives the speed signal from the vehicle speed sensor 220 and evaluates as to whether or not the current speed has reached the target speed. If the controller 200 determines that the current speed has not reached the target speed, it returns to Step S103, and the acceleration or deceleration is continued. If the controller 200 determines that the current speed has reached the target speed, it proceeds to Step S106. In Step S106, the controller 200 checks whether or not the target speed is zero. If the target speed is zero, it means that the traveling apparatus 100 is stopped at the time of Step S106. Otherwise, the traveling apparatus 100 is traveling at the target speed, and thus the controller 200 sends, to the driving wheel unit 210, the driving signal for maintaining the traveling apparatus 100 to travel at the speed (Step S107).

Even while the controller 200 is traveling at a constant speed in Step S107, the controller 200 monitors whether or not the rotation angle θ and the turning angle |φ| have been changed, that is, whether or not the user 900 has tilted the handlebar 115 in the front-back or right-left direction (Step S108). When the controller 200 determines that at least one of the rotation angle θ and the turning angle |φ| has been changed, it returns to Step S101.

When the controller 200 determines that both the rotation angle θ and the turning angle |φ| have not been changed, it returns to Step S107 to continue traveling at the constant speed.

If the controller 200 confirms that the target speed is zero in Step S106, it proceeds to Step S109 and evaluates whether the user 900 gets off the traveling apparatus 100 based on the load signal received from the load sensor 240. If the controller 200 determines that the user 900 has not got off the traveling apparatus 100, i.e., determines that a load is present, it returns to Step S101 to continue the travel control. If the controller 200 determines that the user 900 has got off the traveling apparatus 100, a series of operations is ended.

Although the embodiments have been described with reference to the examples, the front and rear wheels may not be wheels and may be ground-contacting elements such as spherical wheels, a crawler, or the like. Further, a power source for driving the driving wheels is not limited to a motor and instead may be a gasoline engine or the like. Moreover, the adjusting mechanism is not limited to a mechanical mechanism that adjusts the wheel base length using the force of the operation by the user who operates the operation member and may be a mechanism adjusted by an actuator.

From the invention thus described, it will be obvious that the embodiments of the invention may be varied in many ways. Such variations are not to be regarded as a departure from the spirit and scope of the invention, and all such modifications as would be obvious to one skilled in the art are intended for inclusion within the scope of the following claims.

What is claimed is:

1. A traveling apparatus comprising a front wheel steered by an operation by a user and two rear wheels that are rotationally driven independently from each other disposed along a traveling direction and on which the user rides when traveling, the traveling apparatus comprising:
    a front wheel supporting member configured to rotatably support the front wheel;
    a rear wheel supporting member configured to rotatably support the rear wheels;
    an adjusting mechanism configured to adjust a wheel base length between the front wheel and the rear wheels by changing, by the user, a relative position of the front wheel supporting member and the rear wheel supporting member; and
    a controller configured to control a rotational speed of each of the rear wheels based on the wheel base length and a steering angle of the front wheel in such a way that a moving track of the front wheel and moving tracks of the rear wheels draw a concentric arc,
    wherein the controller controls, when a turning angle of the traveling apparatus defined by the wheel base length and the steering angle is constant, the rotational speed of each of the rear wheels based on a target speed that is set in such a way that a first target speed associated with a first wheel base length does not exceed a second target speed associated with a second wheel base length longer than the first wheel base length.

2. The traveling apparatus according to claim 1, wherein the controller controls, when the wheel base length is constant, the rotational speed of each of the rear wheels based on a target speed that is set in such a way that a third target speed associated with a first turning angle does not exceed a fourth target speed associated with a second turning angle smaller than the first turning angle.

3. The traveling apparatus according to claim 1, comprising a handlebar unit that changes, when the user tilts the handlebar unit along the traveling direction, a relative position between the front wheel supporting member and the rear wheel supporting member since a force of an operation by the user is sent to the adjusting mechanism and changes, when the user turns the handlebar unit, the steering angle since a force of the operation by the user is sent to the front wheel supporting member.

* * * * *